(12) United States Patent
Takeo

(10) Patent No.: US 7,248,728 B2
(45) Date of Patent: Jul. 24, 2007

(54) ABNORMAL SHADOW DETECTING SYSTEM

(75) Inventor: Hideya Takeo, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 606 days.

(21) Appl. No.: 10/384,737

(22) Filed: Mar. 11, 2003

(65) Prior Publication Data

US 2003/0169915 A1   Sep. 11, 2003

(30) Foreign Application Priority Data

Mar. 11, 2002 (JP) ............................. 2002-065299
Feb. 3, 2003 (JP) ............................. 2003-025889

(51) Int. Cl.
   *G06K 9/00* (2006.01)
(52) U.S. Cl. ...................... 382/132; 382/173
(58) Field of Classification Search ................ 382/128, 382/132, 173, 180; 378/37; 128/922
   See application file for complete search history.

(56) References Cited

U.S. PATENT DOCUMENTS

| | | | | |
|---|---|---|---|---|
| 4,340,911 A | * | 7/1982 | Kato et al. ................. | 358/280 |
| 5,133,020 A | * | 7/1992 | Giger et al. ................. | 382/6 |
| 5,572,565 A | * | 11/1996 | Abdel-Mottaleb ........... | 378/37 |
| 5,627,907 A | * | 5/1997 | Gur et al. ................... | 382/132 |
| 5,657,362 A | * | 8/1997 | Giger et al. ................. | 378/37 |
| 5,761,334 A | | 6/1998 | Nakajima et al. ........... | 382/132 |
| 5,832,103 A | * | 11/1998 | Giger et al. ................. | 382/130 |
| 6,075,879 A | * | 6/2000 | Roehrig et al. ............. | 382/132 |
| 6,272,233 B1 | | 8/2001 | Takeo .......................... | 382/128 |

OTHER PUBLICATIONS

Method of automatically classifying mammograms on the basis of evaluation of effective mammary gland densities' by Professor Fujita in the university of Gifu ("Iyodenshi to Seitaikogaku", vol. 38, No. 2, Jun. 2000).

* cited by examiner

*Primary Examiner*—Andrew W. Johns
(74) *Attorney, Agent, or Firm*—Sughrue Mion, PLLC

(57) ABSTRACT

In an abnormal shadow detecting system, a mammary gland distribution map generating system generates a mammary gland distribution map of each of left and right breasts by dividing an image of each of the left and right breasts into a plurality of ranges according to the density of the image on the basis of image data representing the image, and an extracting system extracts a bilaterally asymmetric range by comparing the ranges of the mammary gland distribution map for one of the left and right breasts with those of the mammary gland distribution map for the other breast.

14 Claims, 6 Drawing Sheets

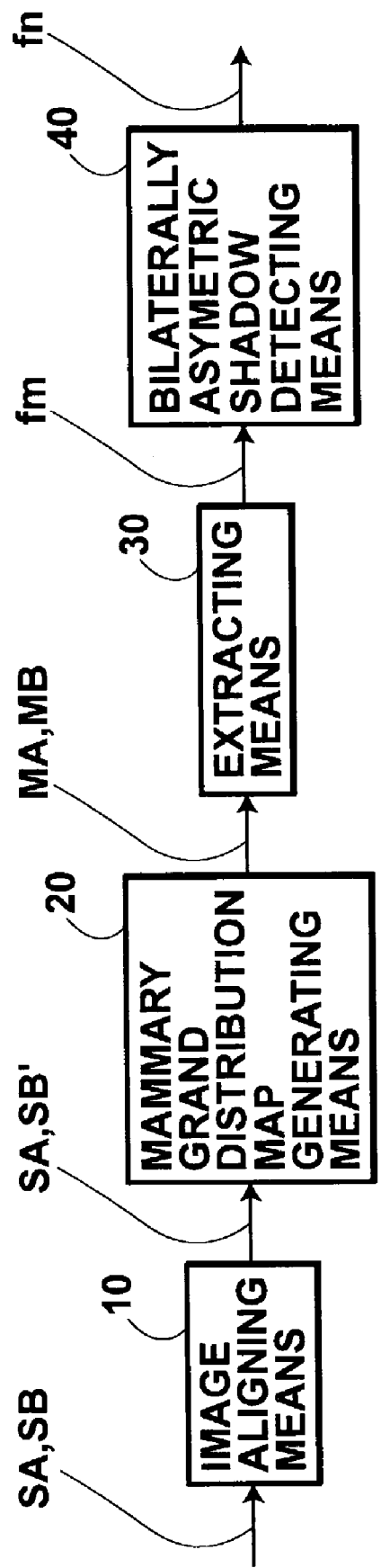

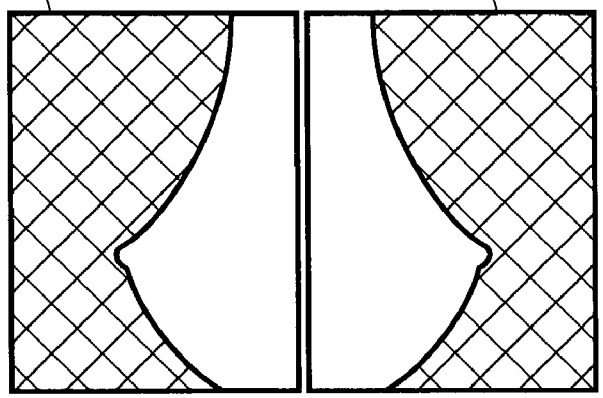
FIG.2A SA  FIG.2B SB
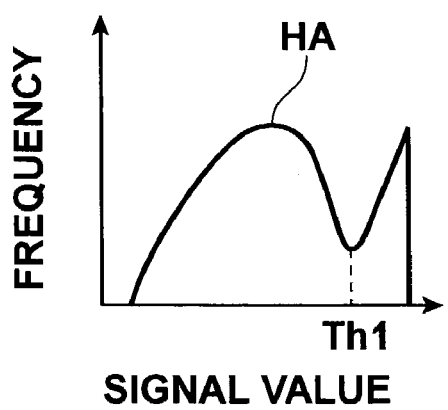
FIG.3A
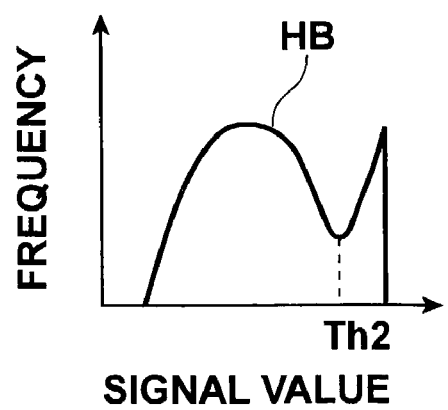
FIG.3B

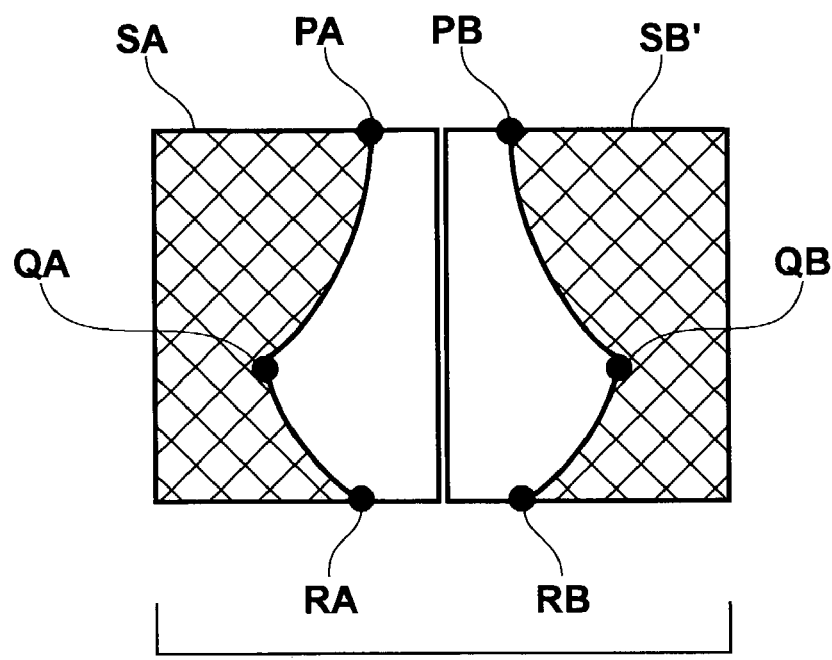
FIG.4
FIG.5A  FIG.5B
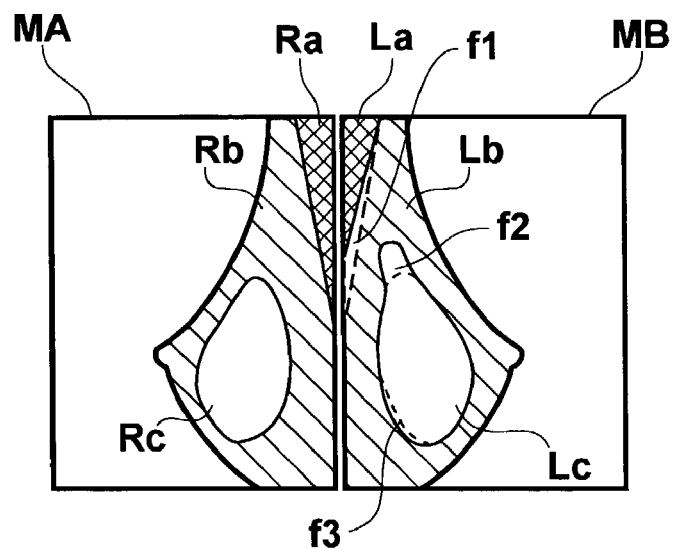

ABNORMAL SHADOW DETECTING SYSTEM

BACKGROUND OF THE INVENTION

1. Field of the Invention

This invention relates to a system for detecting an abnormal shadow in a radiation image, and more particularly to a system for detecting an abnormal shadow of a breast and/or a bilaterally asymmetric shadow of breasts on the basis of image data representing a radiation image of the breast or breasts.

2. Description of the Related Art

In the medical field, to find a diseased part of a patient or to observe a diseased part of a patient and diagnose progress of disease by reading a radiation image of the object (patient) has been a common operation. However, radiation image reading often depends upon experience and abilities of the reader and is not necessarily objective.

For example, it is necessary to find an abnormal shadow representing a growth and/or a micro calcification representative of a cancerous part in a mammogram (a radiation image of a breast) taken for the purpose of a breast cancer examination. However, depending on the reader, the abnormal shadow cannot be properly detected. Accordingly, there has been a demand to properly detect an abnormal shadow including shadows of a growth and a micro calcification irrespective of abilities of the reader.

In order to meet this demand, there have been proposed abnormal shadow detecting systems (computer-aided image diagnosis systems), for instance, in U.S. Pat. No. 5,761,334 in which an abnormal shadow is automatically detected by the use of a computer on the basis of image data representing a radiation image of the object. In the abnormal shadow detecting system, an abnormal shadow is automatically detected on the basis of the density distribution in the shadow and/or the feature of the shadow by the use of an iris filter processing which is mainly suitable for detecting a growth shadow and/or a morphology filter processing which is mainly suitable for detecting a micro calcification shadow.

The abnormal shadows in the mammogram include a bilaterally asymmetric shadow and an abnormal shadow which appears due to change with time.

The bilaterally asymmetric shadow is a benignant shadow which cannot be perfectly determined not to be a shadow of a cancerous part, belongs to category III (It is said that to detect such an abnormal shadow is important in a medical examination), and is characterized in that the left and right breasts are not symmetric in density.

The abnormal shadow which appears due to change with time is an abnormal shadow representing a part which has been altered into cancer and is characterized in that the mammograms of the same object taken at different times are different from each other in density.

Since ranges of such abnormal shadows are not necessarily circular convex ranges or ranges of high brightness in the mammograms, and are characterized in that a density difference exists between particular images, such abnormal shadows cannot be detected by the conventional iris filter processing or a method simply using the density of the radiation image.

Though various methods of detecting a prospective abnormal shadow related to breast cancer have been proposed, no method of efficiently detecting a bilaterally asymmetric shadow or an abnormal shadow which appears due to change with time has been proposed. Though we, this applicant, have proposed in our U.S. Pat. No. 6,272,233 a method of detecting an abnormal shadow in which the density of a radiation image of the left breast of a patient is compared with that of a radiation image of the right breast of the same patient, the method is for evaluating the probability that a prospective abnormal shadow range detected in one of the radiation image of the left and right breasts represents a true cancer by comparing the output signals obtained by carrying out the iris filter processing on the prospective abnormal shadow range and the corresponding part in the other radiation image, and is not effective for detecting a bilaterally asymmetric shadow.

SUMMARY OF THE INVENTION

In view of the foregoing observations and description, the primary object of the present invention is to provide an abnormal shadow detecting system capable of efficiently detecting a bilaterally asymmetric shadow or an aging abnormal shadow (which appears due to change with time) which has been conventionally difficult to detect.

In accordance with a first aspect of the present invention, there is provided an abnormal shadow detecting system comprising a mammary gland distribution map generating means which generates a mammary gland distribution map of each of left and right breasts by dividing an image of each of the left and right breasts into a plurality of ranges according to the density of the image on the basis of image data representing the image, and an extracting means which extracts a bilaterally asymmetric range by comparing the ranges of the mammary gland distribution map for one of the left and right breasts with those of the mammary gland distribution map for the other breast.

In accordance with a second aspect of the present invention, there is provided an abnormal shadow detecting system comprising a mammary gland distribution map generating means which generates a pair of mammary gland distribution maps of a breast by dividing each of two images of the breast taken at different times into a plurality of ranges according to the density of the image on the basis of image data representing the image, and an extracting means which extracts a difference range where a difference exists between the two images by comparing the ranges of the mammary gland distribution map for one of the images with those of the mammary gland distribution map for the other image.

The "mammary gland distribution map" as used here means a map representing a plurality of ranges when an image of a breast is divided into a plurality of ranges including, for instance, a fat range, a mammary gland range and a pectoral muscle range, according to, for instance, the density of the image of the breast.

The "pectoral muscle range" as used here means a side of the body (trunk) which appears in a side image of a breast, the "mammary gland range" as used here means an range where the density of mammary glands is relatively high and the density of fat is relatively low, and the "fat range" as used here means an range where the density of fat is relatively high and the density of mammary glands is relatively low.

The "images of the left and right breasts" may be either those of a patient taken at one time or those of a patient taken at different times.

In the abnormal shadow detecting systems in accordance with the first and second aspects of the present invention, the mammary gland distribution map generating means may divide, for instance, an object range of a side view of each breast into a pectoral muscle range, a mammary gland range and a fat range.

Further, in the abnormal shadow detecting systems in accordance with the first and second aspects of the present invention, the mammary gland distribution map generating means may divide an object range of a front view of each breast into a mammary gland range and a fat range It is preferred that the abnormal shadow detecting system in accordance with the first aspect of the present invention further comprises a bilaterally asymmetric shadow detecting means which detects a prospective range of the bilaterally asymmetric shadow from the bilaterally asymmetric ranges, extracted by the extracting means, on the basis of information on the bilaterally asymmetric range.

The information on the bilaterally asymmetric range may comprise at least one of information on the position in the image of the range, information on the area of the range, information on the variance, and information on the density.

It is preferred that the abnormal shadow detecting system in accordance with the second aspect of the present invention further comprises an abnormal shadow detecting means which detects a prospective range of the abnormal shadow from the difference ranges, extracted by the extracting means, on the basis of information on the difference range.

The information on the difference range may comprise at least one of information on the position in the image of the range, information on the area of the range, information on the variance, and information on the density.

In accordance with the first aspect of the present invention, since a bilaterally asymmetric range is extracted by comparing the ranges of the mammary gland distribution map for one of the left and right breasts with those of the mammary gland distribution map for the other breast, a bilaterally asymmetric shadow which has been conventionally difficult to detect can be efficiently detected.

In accordance with the second aspect of the present invention, since a difference range where a difference exists between two images taken at different times is extracted by comparing the ranges of the mammary gland distribution map for one of the images with those of the mammary gland distribution map for the other image, an aging abnormal shadow which has been conventionally difficult to detect can be efficiently detected and at the same time, to watch process of a cancerous part is facilitated.

When the mammary gland distribution map generating means divides an object range of a side view of each breast into a pectoral muscle range, a mammary gland range and a fat range or divides an object range of a front view of each breast into a mammary gland range and a fat range in the abnormal shadow detecting systems in accordance with the first and second aspects of the present invention, bilaterally asymmetric ranges near the boundary between the mammary gland range and the fat range, which is to be most remarked, can be detected, whereby a bilaterally asymmetric shadow can be efficiently detected.

When the abnormal shadow detecting system in accordance with the first aspect of the present invention further comprises a bilaterally asymmetric shadow detecting means which detects a prospective range of the bilaterally asymmetric shadow from the bilaterally asymmetric ranges, extracted by the extracting means, on the basis of information on the bilaterally asymmetric range, the rate of error in detecting the bilaterally asymmetric shadow is reduced, which results in improvement of detection performance.

When the abnormal shadow detecting system in accordance with the second aspect of the present invention further comprises an abnormal shadow detecting means which detects a prospective range of the abnormal shadow from the difference ranges, extracted by the extracting means, on the basis of information on the difference range, the rate of error in detecting the abnormal shadow is reduced, which results in improvement of detection performance.

BRIEF DESCRIPTION OF THE DRAWINGS

FIG. 1 is a schematic view showing in brief the arrangement of an abnormal shadow detecting system in accordance with a first embodiment of the present invention, FIGS. 2A and 2B are side views of right and left breasts, FIGS. 3A and 3B are histograms of image data of the side views of right and left breasts shown in FIGS. 2A and 2B, FIG. 4 is a view for illustrating alignment of the objects in the side views of right and left breasts, FIGS. 5A and 5B are views showing mammary gland maps respectively for the right and left breasts.

DESCRIPTION OF THE PREFERRED EMBODIMENTS

Figure 6:
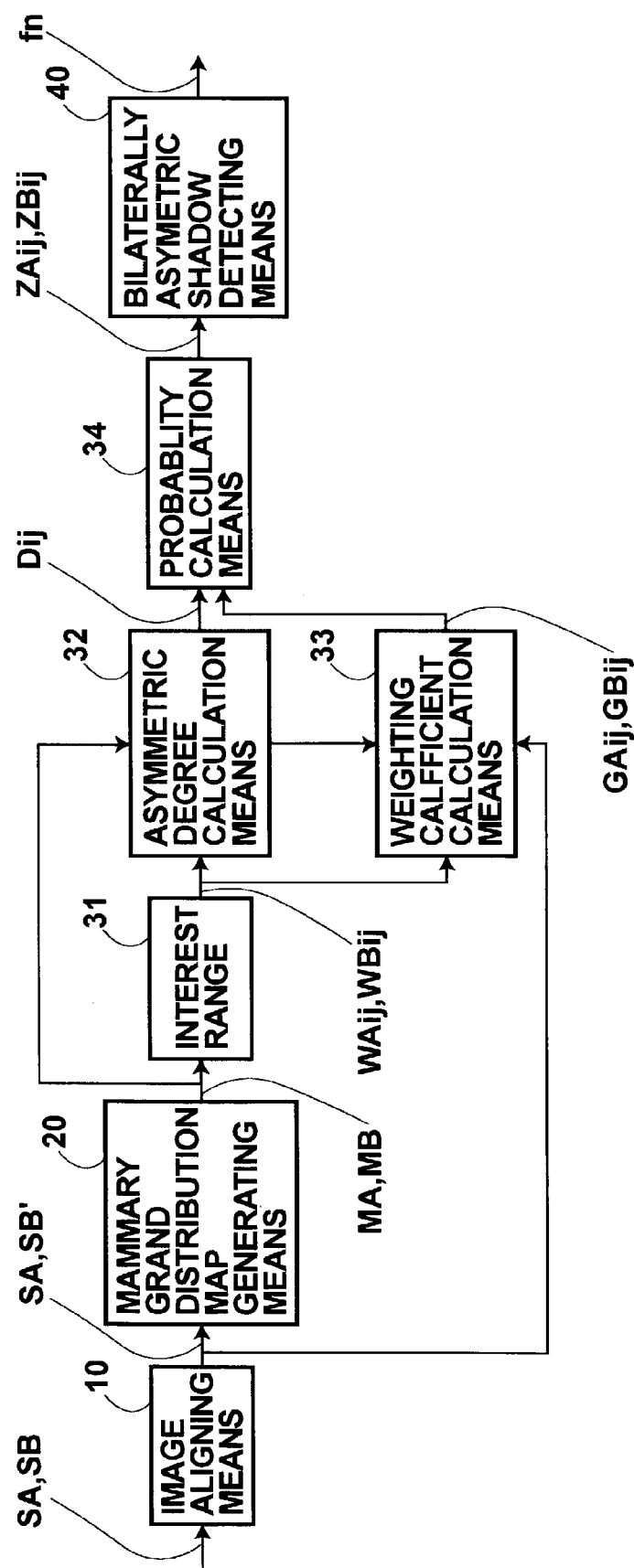
FIG. 6 is a schematic view showing in brief the arrangement of an abnormal shadow detecting system in accordance with a second embodiment of the present invention.

In FIG. 1, an abnormal shadow detecting system in accordance with a first embodiment of the present invention comprises an image aligning means 10 which aligns side image data for a right breast (image data representing a side view of a right breast) SA and side image data for a left breast (image data representing a side view of a left breast) SB with each other so that a profile of the image of the right breast (FIG. 2A) represented by the image data SA and a profile of the image of the left breast (FIG. 2B) represented by the image data SB become substantially bilaterally symmetric, a mammary gland distribution map generating means 20 which generates mammary gland distribution maps MA (FIG. 5A) and MB (FIG. 5B) respectively for the right and left breasts by dividing images of the right and left breasts aligned by the image aligning means 10 into a plurality of ranges according to the density of the image, an extracting means 30 which extracts bilaterally asymmetric ranges fm (m stands for 1, 2, . . . ) by comparing the ranges of the mammary gland distribution map for one of the left and right breasts with those of the mammary gland distribution map for the other breast, and a bilaterally asymmetric shadow detecting means 40 which detects a prospective bilaterally asymmetric shadow range fn from the bilaterally asymmetric ranges, extracted by the extracting means 30, on the basis of information on the bilaterally asymmetric range.

FIG. 2A shows a side image of the right breast represented by the image data SA and FIG. 2B shows a side image of the left breast represented by the image data SB.

Operation of the abnormal shadow detecting system of this embodiment will be described, hereinbelow.

When a pair of pieces of image data SA and SB for the right and left breasts are input into the image aligning means 10 from, for instance, an image read-out apparatus, an object range is extracted from each of the images represented by the pieces of image data SA and SB.

The image aligning means 10 creates histograms HA and HB of the side views of right and left breasts as shown in FIGS. 3A and 3B, and carries out on the histograms HA and HB binary-coding using threshold values Th1 and Th2 representing boundaries between an object range and a background range in the images SA and SB of the right and left breasts, thereby obtaining object ranges for the respective images.

Then in the object ranges thus obtained, positions of tops QA and QB, and upper and lower ends PA and PB and RA and RB are obtained and on the basis of the image data for one of the breasts, the image data for the other breast is transformed by, for instance, affine transformation so that these positions become laterally symmetric. In this particular embodiment, it is assumed that the image data SB for the left breast is transformed into image data SB' on the basis of the image data SA for the right breast.

Then the mammary gland distribution map generating means 20 generates mammary gland distribution maps MA (FIG. 5A) and MB (FIG. 5B) respectively for the right and left breasts by dividing images of the right and left breasts aligned by the image aligning means 10 into a plurality of ranges according to the density of the image. For example, the mammary gland distribution maps can be generated according to mammary gland distribution extracting technology disclosed in a paper entitled "Method of automatically classifying mammograms on the basis of evaluation of effective mammary gland densities" by Professor Fujita in the university of Gifu ("Iyodenshi to Seitaikogaku", vol. 38, No. 2, June/2000). That is, for example, pectoral muscle lines forming a boundary between the pectoral muscle range and other ranges are first extracted on the basis of the positions and/or shapes of pectoral muscles which have been empirically known, and change in density in the image, and the ranges surrounded by the pectoral muscle lines and the skin lines of the object are determined to be pectoral muscle ranges. The range obtained by subtracting the pectoral muscle ranges from the object range is determined to be a breast range. A threshold value T1 of density is set on the basis of, for instance, a histogram of the pectoral muscle range and the breast range, and the range of the breast range where the density is lower than the threshold value T1 is determined to be the mammary gland range whereas the range of the breast range where the density is higher than the threshold value T1 is determined to be a fat range. In this way, each of the object areas of the right and left breasts can be divided into three ranges, the pectoral muscle range Ra (La), the fat range Rb (Lb) and the mammary gland range Rc (Lc).

The extracting means 30 extracts bilaterally asymmetric ranges f1, f2, f3 (FIGS. 5A and 5B) by comparing the ranges of the mammary gland distribution map for one of the left and right breasts with those of the mammary gland distribution map for the other breast. f1 is a bilaterally asymmetric range between the pectoral muscle range Ra (La) and the fat range Rb (Lb) and f2 and f3 are bilaterally asymmetric ranges between the fat range Rb (Lb) and the mammary gland range Rc (Lc).

The bilaterally asymmetric shadow detecting means 40, rejects some of the bilaterally asymmetric ranges f1, f2, f3 as unsuitable as the prospective bilaterally asymmetric shadow range on the basis of the following references.

(1) position: Only ranges on the boundaries between the fat range and the mammary gland range are to be remarked and other ranges are to be rejected.
(2) area: Ranges whose area is relatively small are not so important and are to be rejected.
(3) variance: Ranges where variance of the image signals is relatively small are less probable to be an abnormal shadow and are to be rejected.
(4) density: Ranges where the image signals are relatively high in density (relatively low in brightness) are less probable to be an abnormal shadow and are to be rejected.

In each of the references (2), (3) and (4), a threshold value is empirically set.

For example, when it is assumed that variance of the image signals is relatively large and the density of the image signals are relatively low in all the bilaterally asymmetric ranges f1, f2 and f3, the bilaterally asymmetric range f1 is rejected on the basis of the reference (1) and the bilaterally asymmetric range f3 is rejected on the basis of the reference (2) whereas only the bilaterally asymmetric range f2 is detected as the prospective bilaterally asymmetric range.

It is possible to select all the bilaterally asymmetric ranges as the prospective bilaterally asymmetric shadow range without selection based on the references as described above so that determination whether they are suitable as the prospective bilaterally asymmetric shadow range is left to the doctor's care. Further, whether the bilaterally asymmetric ranges are suitable as the prospective bilaterally asymmetric shadow range may be determined on the basis of at least one of the aforesaid references (1) to (4).

An abnormal shadow detecting system in accordance with a second embodiment of the present invention will be described, hereinbelow.

In FIG. 6, an abnormal shadow detecting system in accordance with a second embodiment of the present invention comprises an image aligning means 10 which aligns side image data for a right breast (image data representing a side view of a right breast) SA and side image data for a left breast (image data representing a side view of a left breast) SB with each other so that a profile of the image of the right breast (FIG. 2A) represented by the image data SA and a profile of the image of the left breast (FIG. 2B) represented by the image data SB become substantially bilaterally symmetric, a mammary gland distribution map generating means 20 which generates mammary gland distribution maps MA (FIG. 5A) and MB (FIG. 5B) respectively for the right and left breasts by dividing images of the right and left breasts aligned by the image aligning means 10 into a plurality of ranges according to the density of the image, an interest range setting means 31 which sets ranges of interest WAij and WBij of a predetermined size with each pixel positioned on the center of the ranges of interest WAij and WBij in the respective mammary gland distribution maps MA and MB, an asymmetric degree calculation means 32 which calculates the degree of bilateral asymmetry Dij between the ranges of interest for each combination of a range of interest in the image of the right breast and a corresponding range of interest in the image of the left breast, a weighting coefficient calculation means 33 which calculates weighting coefficients GAij and GBij for ranges of interest WAij and WBij on the basis of average densities VAij and VBij of the ranges of the images SA and SB of the right and left breasts corresponding to the ranges of interest WAij and WBij, a probability calculation means 34 which calculates an evaluation SAij (SBij), representing the degree in which the range in the image of the right or left breast corresponding to the range of interest WAij (WBij) can include an abnormal shadow, on the basis of the degree of bilateral asymmetry Dij and the weighting coefficient GAij (GBij) for the range of interest, and a bilaterally asymmetric shadow detecting means 40 which detects a prospective bilaterally asymmetric shadow range on the basis of the evaluation SAij (SBij).

Operation of the abnormal shadow detecting system of this embodiment will be described, hereinbelow. The process from the time the image data SA and SB are input into the image aligning means 10 to the time the mammary gland distribution maps MA and MB are generated by the mammary gland distribution map generating means 20 is the same as in the first embodiment, and accordingly will not be described here.

Figure 7A:
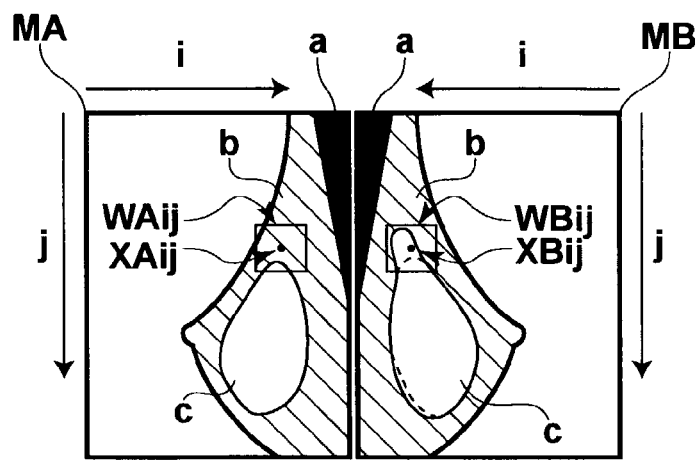
FIG. 7A is a view for illustrating setting of ranges of interest in the mammary gland distribution maps.

When the mammary gland distribution maps MA and MB are generated, the interest range setting means 31 sets a square (may be circular) range of interest WAij of a predetermined size with a predetermined pixel positioned on the center of the range of interest WAij in the mammary gland distribution map MA for the right breast, and then sets a square range of interest WBij of the same size with a pixel in a position symmetric to the position of said predetermined pixel positioned on the center of the range of interest WBij in the mammary gland distribution map MB for the left breast as shown in FIG. 7A, wherein (i, j) represents coordinates of the pixel on each of the mammary gland distribution maps MA and MB.

Figure 7B:
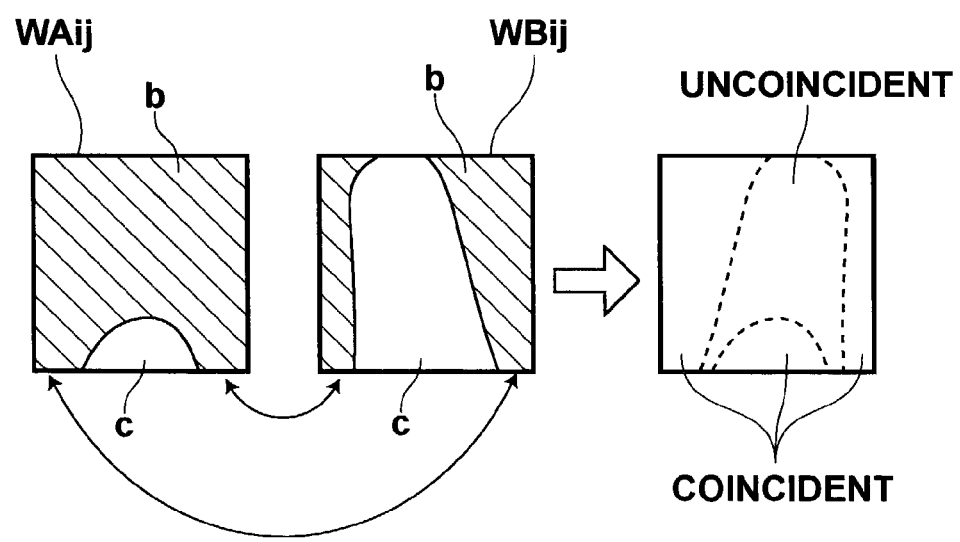
FIG. 7B is a view for illustrating comparison of ranges of interest in the mammary gland distribution maps.

As shown in FIG. 7B, the bilaterally asymmetric shadow detecting means 40 folds the mammary gland distribution map in one of the corresponding ranges of interest WAij and WBij over the mammary gland distribution map in the other of the corresponding ranges of interest WAij and WBij and compares them with each other. Then the bilaterally asymmetric shadow detecting means 40 calculates the degree of coincidence of the ranges in the mammary gland distribution maps MA and MB, i.e., the pectoral muscle range a, the fat range b and the mammary gland range c, (the ratio of the number of the pixels which are in the same ranges in the mammary gland distribution maps MA and MB to the total number of the pixels in the range of interest) as representing the degree of bilateral asymmetry Dij between the ranges of interest WAij and WBij.

Figure 8:
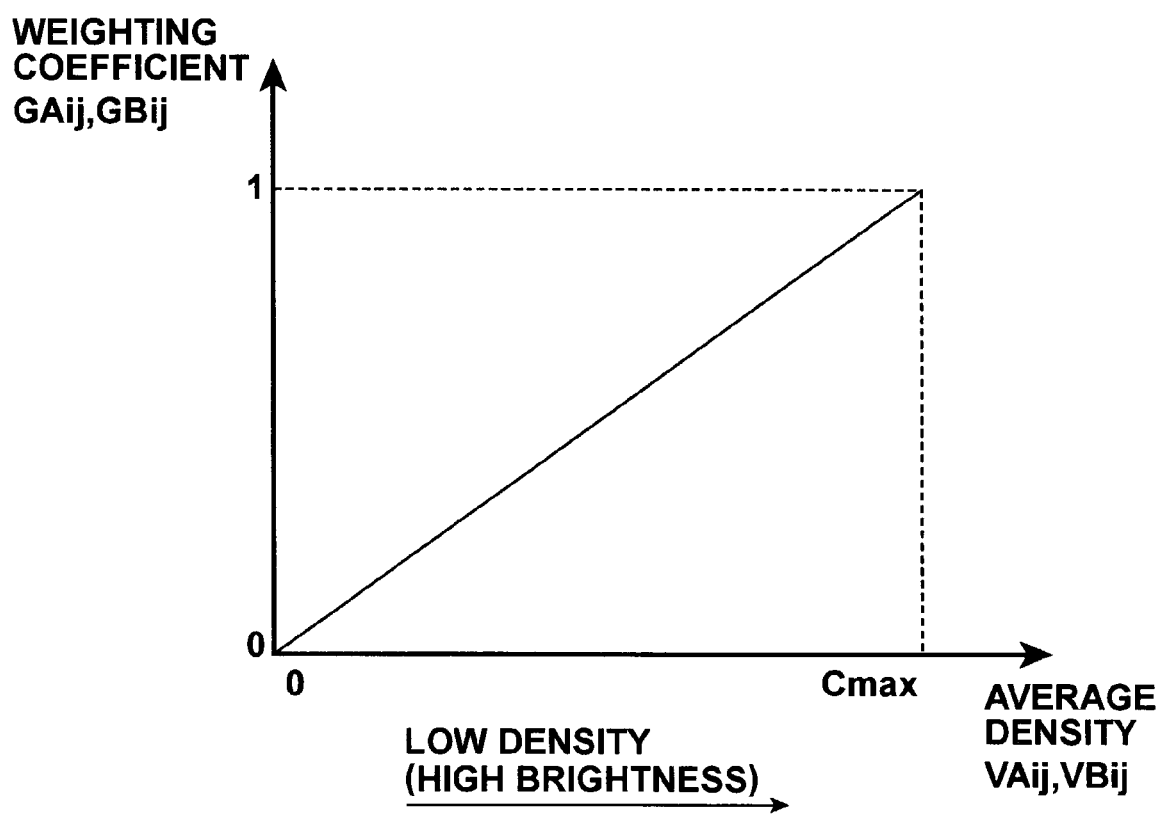
FIG. 8 is a graph showing a relation between the average density and the weighting coefficient.

The weighting coefficient calculation means 33 calculates an average density VAij (average value of pixel) of the range of the image SA of the right breast corresponding to the range of interest WAij set in the mammary gland distribution map MA for the right breast, and calculates a weighting coefficient GAij for the range of interest WAij according to a relation between the average density and the weighting coefficient such as shown in FIG. 8. Similarly, the weighting coefficient calculation means 33 calculates a weighting coefficient GBij for the range of interest WBij set in the mammary gland distribution map MB for the left breast according to the average density VBij of the range of the image SB of the left breast corresponding to the range of interest WBij. It is assumed here that the larger the value of pixel is, the lower the density is (the higher the brightness is), and the variable range of the value of pixel is 0 to Cmax whereas the variable range of the weighting coefficient is 0 to 1.

The probability calculation means 34 calculates an evaluation SAij (SBij) as the product of the degree of bilateral asymmetry and the weighting coefficient GAij (GBij) for the range of interest (SAij=Dij×GAij, SBij=Dij×GBij).

After, the range of interest is set, the degree of bilateral asymmetry is calculated, the weighting coefficient is calculated and the evaluation is calculated for all the pixels in the object range in the mammary gland distribution map for each of the right and left breast, the bilaterally asymmetric shadow detecting means 40 detects a range of interest where the evaluation is larger than a predetermined threshold value Th3 as the prospective bilaterally asymmetric shadow range fn.

In the abnormal shadow detecting system of the second embodiment, a range of interest whose evaluation, obtained by multiplying the degree of bilateral asymmetry which takes a larger value as the proportion of the asymmetric ranges increases by the weighting coefficient which takes a larger value as the density lowers, exceeds a predetermined threshold value is extracted as the prospective bilaterally asymmetric shadow range, that is, the prospective bilaterally asymmetric shadow range is detected taking into account not only the degree of bilateral asymmetry but also the density, and accordingly, the accuracy of detection is improved and the diagnostic efficiency is improved.

The relation between the average density and the weighting coefficient need not be linear as shown in FIG. 8 but may be of a curve.

Though, in the first and second embodiments described above, the bilaterally asymmetric shadow is detected by extracting a bilaterally asymmetric range by the use of images of the right and left breasts, an aging abnormal shadow which appears due to change with time can be detected by extracting a difference range in place of the bilaterally asymmetric range by the use of images of a breast taken at different times in place of images of the right and left breasts. In this case, in the abnormal shadow detecting system of the second embodiment, the degree of uncoincidence between the images is calculated in place of the degree of bilateral asymmetry and the mammary gland distribution maps in the ranges of interest are compared superposing one on another without turning over one of them.

What is claimed is:

1. An abnormal shadow detecting system comprising:
   a mammary gland distribution map generating means which generates a mammary gland distribution map of each of left and right breasts by dividing an image of each of the left and right breasts into a plurality of ranges according to the density of the image on the basis of image data representing the image,
   and an extracting means which extracts a bilaterally asymmetric range by comparing the ranges of the mammary gland distribution map for one of the left and right breasts with those of the mammary gland distribution map for the other breast.

2. An abnormal shadow detecting system as defined in claim 1 in which the mammary gland distribution map generating means divides an object range of a side view of each breast into a pectoral muscle range, a mammary gland range and a fat range.

3. The system of claim 2, wherein the pectoral muscle range comprises data of pectoral muscle tissue.

4. An abnormal shadow detecting system as defined in claim 1 in which the mammary gland distribution map generating means divides an object range of a front view of each breast into a mammary gland range and a fat range.

5. An abnormal shadow detecting system as defined in claim 1 further comprising a bilaterally asymmetric shadow detecting means which detects a prospective range of the bilaterally asymmetric shadow from the bilaterally asymmetric ranges, extracted by the extracting means, on the basis of information on the bilaterally asymmetric range.

6. An abnormal shadow detecting system as defined in claim 5 which the information on the bilaterally asymmetric range comprises at least one of information on the position in the image of the range, information on the area of the range, information on the variance, and information on the density.

7. The system of claim 5, wherein the prospective range rejects bilaterally asymmetric ranges as a shadow depending on at least one of: position of the fat range and mammary gland range, a small area of the extracted region, a small variance of the extracted region and a high density (low brightness) of the extracted region.

8. The system of claim 1, further comprising a transform means for aligning points of data for the left and right breasts and wherein the mammary gland distribution map generating means operates on an output of the transform means.

9. The system of claim 1, wherein the extracting means determines a degree of bilateral asymmetry by applying respective weighting coefficients to image data of the left and right breasts based on average density ranges of the data of the left and right breasts and calculates a probability of the shadow region based on the weighting coefficients.

10. An abnormal shadow detecting system comprising a mammary gland distribution map generating means which generates a pair of mammary gland distribution maps of a breast by dividing each of two images of the breast taken at different times into a plurality of ranges according to the density of the image on the basis of image data representing the image, and an extracting means which extracts a difference range where a difference exists between the two images by comparing the ranges of the mammary gland distribution map for one of the images with those of the mammary gland distribution map for the other image.

11. An abnormal shadow detecting system as defined in claim 10 which the mammary gland distribution map generating means divides an object range of a side view of each breast into a pectoral muscle range, a mammary gland range and a fat range.

12. An abnormal shadow detecting system as defined in claim 10 which the mammary gland distribution map generating means divides an object range of a front view of each breast into a mammary gland range and a fat range.

13. An abnormal shadow detecting system as defined in claim 10 further comprising an abnormal shadow detecting means which detects a prospective range of the abnormal shadow from the difference ranges, extracted by the extracting means, on the basis of information on the difference range.

14. An abnormal shadow detecting system as defined in claim 13 in which the information on the difference range may comprise at least one of information on the position in the image of the range, information on the area of the range, information on the variance, and information on the density.

* * * * *